United States Patent
Provencher

(10) Patent No.: US 11,163,385 B2
(45) Date of Patent: Nov. 2, 2021

(54) MULTI-LAYERED FLEXIBLE DEVICE FOR USE IN EITHER A PASSIVE OR ACTIVE MANNER WITH A TOUCHSCREEN COMPUTING DEVICE

(71) Applicant: Samuel David Provencher, Waltham, MA (US)

(72) Inventor: Samuel David Provencher, Waltham, MA (US)

(73) Assignee: Boston Inventions, LLC, Waltham, MA (US)

( * ) Notice: Subject to any disclaimer, the term of this patent is extended or adjusted under 35 U.S.C. 154(b) by 0 days.

(21) Appl. No.: 16/866,414

(22) Filed: May 4, 2020

(65) Prior Publication Data
US 2020/0348769 A1    Nov. 5, 2020

Related U.S. Application Data

(60) Provisional application No. 62/841,895, filed on May 2, 2019.

(51) Int. Cl.
*G06F 3/039*    (2013.01)

(52) U.S. Cl.
CPC .................................. *G06F 3/0393* (2019.05)

(58) Field of Classification Search
CPC ...................................................... G06F 3/0393
See application file for complete search history.

(56) References Cited

U.S. PATENT DOCUMENTS

| | | | |
|---|---|---|---|
| 2014/0165262 A1* | 6/2014 | Klausner | G06F 3/014 2/161.1 |
| 2017/0020255 A1* | 1/2017 | Vavrunek | A47L 25/00 |
| 2017/0051183 A1* | 2/2017 | Murthy | B32B 7/12 |
| 2017/0172216 A1* | 6/2017 | Casali | A41D 1/04 |
| 2019/0321867 A1* | 10/2019 | Bates | C11D 3/386 |

* cited by examiner

*Primary Examiner* — Charles V Hicks
(74) *Attorney, Agent, or Firm* — Ascentage Patent Law, LLC; Travis Lee Johnson

(57) ABSTRACT

A device for use with a touchscreen or a touch-enabled computing device. The device includes a first layer, a second layer and an attachment device. The first layer has a first set of characteristics. The second layer has a second set of characteristics with at least one or more characteristics differing from that of the first layer. The attachment device is configured to combine the first and second layers about an outer periphery and at a second internal portion.

12 Claims, 8 Drawing Sheets

MULTI-LAYERED FLEXIBLE DEVICE FOR USE IN EITHER A PASSIVE OR ACTIVE MANNER WITH A TOUCHSCREEN COMPUTING DEVICE

PRIORITY

This application claims priority to U.S. provisional application No. 62/841,895, which was filed on May 2, 2019, and is hereby incorporated by reference in its entirety.

COPYRIGHT STATEMENT

A portion of the disclosure of this patent application document contains material that is subject to copyright protection including the drawings. The copyright owner has no objection to the facsimile reproduction by anyone of the patent document or the patent disclosure as it appears in the Patent and Trademark Office file or records, but otherwise reserves all copyright rights whatsoever.

BACKGROUND OF THE INVENTION

1. Field of the Invention

The disclosure relates to consumer products to be used with touchscreen devices and peripherals.

2. Description of the Prior Art

There have been some attempts to manage the difference between the side or palm of a hand resting on a touchscreen as compared to a stylus or finger. These systems can require complex algorithms or other software, which may use vital resources of the processing device. Additionally, the screen surface on most touchscreens tends to attract oils from a user's hands and results in a less optimal viewing plane. The touchscreens attract oils and dirt despite specialized oleophobic coatings on the screen. These coatings can wear away over time, lessening their effectiveness. This can occur even with proper cleaning. One way to combat this is to take steps to keep the screen from getting dirty in the first place. Another problem to solve is that when writing or drawing on a touchscreen surface the glass used (or even screen protectors) responds differently than a traditional sheet of paper that most users learned to write on. As a result, the present invention seeks to provide a device that aids in the user's writing and/or drawing capabilities when using a touchscreen, minimizing the need for additional resources required by software to distinguish between the side portion of a hand, and maintain a cleaner touchscreen viewing surface.

SUMMARY

It is desirable to have a device for use with a touchscreen that reduces contamination of the touchscreen and provides more consistency of the finger or stylus experience while writing or drawing on the touchscreen.

As such, contemplated herein is a device for use with a touchscreen or a touchscreen computing device. The device comprises a first layer, a second layer, and an attachment device configured to combine the first and second layers about an outer. The first layer has a first set of characteristics and the second layer has a second set of characteristics wherein at least one or more characteristics differ from that of the first layer.

The first layer characteristics includes foldable, washable, lightweight, durable, and grip the user. In order to achieve these characteristics, the first layer comprises a suitable material such as a microfiber suede.

The second layer characteristics includes foldable, collect dirt from the touchscreen, washable, lightweight, durable, and slip on the touchscreen. In order to achieve these characteristics, the second layer comprises an elastane blend. In one embodiment, the second layer comprises a woven material that collects containments when the device moves along a surface of the touchscreen.

In one embodiment, a third layer is disposed between the first and second layers. In another embodiment, a third layer and a fourth layer are disposed between the first and second layers. The third layer and the fourth layer provide thickness and padding to the device.

The attachment device includes stitching the layers together. In one embodiment, the stitching is configured to help the device slide on the touchscreen.

In one embodiment, the device is configured to be folded and retain its original characteristics when the device is unfolded.

Further contemplated herein is a method of writing or drawing on a touchscreen of a computing device. The method includes providing a device configured to slide along a surface of the touchscreen. The device is placed on the surface of the touchscreen. A hand rests on a top layer of the device. A person writes or draws on the touch screen using a stylus, a finger, or an electronic pen. When the hand moves the device moves with the hand and slides along the surface of the touchscreen.

In one embodiment, when the hand moves the device moves with the hand and slides along the surface of the touchscreen and the device cleans the surface of the touchscreen as moves along the surface of the touchscreen.

DETAILED DESCRIPTION

To provide an overall understanding of the systems, devices, and methods described herein, certain illustrative embodiments will be described. Although the embodiments and features described herein are frequently described for use in clothing applications, it will be understood that all the components, mechanisms, systems, methods, and other features outlined below can be combined with one another in any suitable manner and can be adapted and applied to other similar systems and in any number of suitable settings.

The present embodiments have been developed to aid in a user's writing and/or drawing capabilities when using a touchscreen or a touchscreen computing device.

Figure 1A:
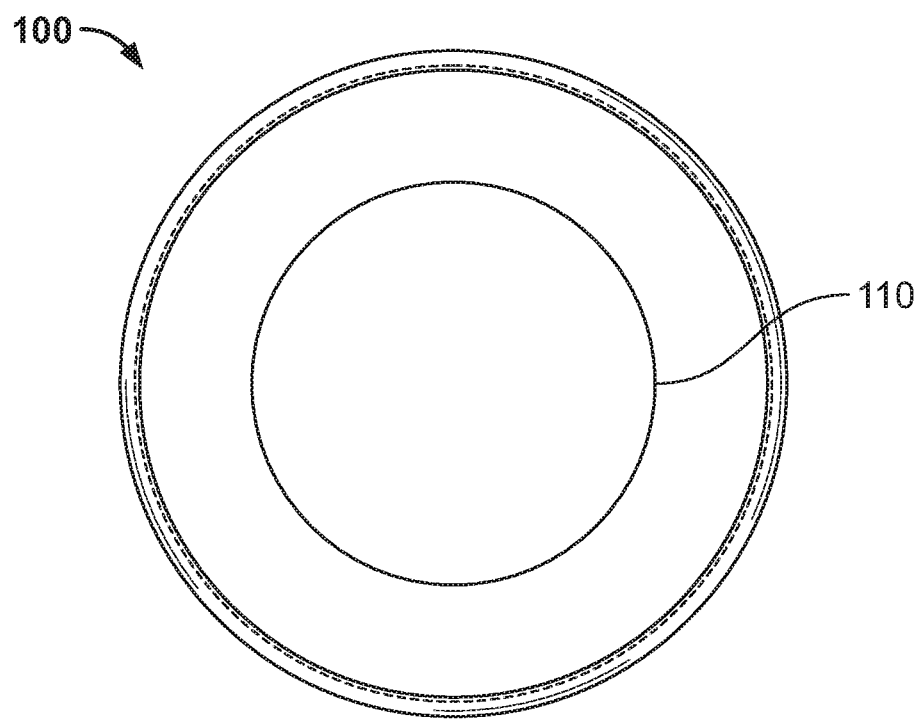
FIG. 1A illustrates a top view of a device for use with a touchscreen.

FIG. 1A illustrates a top view of a device 100 for use with a touchscreen. The device rests on the surface of a touchscreen (or other hard surface) and the user rests a hand on the device. The device is designed to provide comfortable support to the user while aiding in protecting the touchscreen from scratches and from dirt, oil, microbes, germs, or viruses that are on the user's hand. The device can also prevent transfer of germs one the surface of the device to the user as well, as the device becomes a barrier. In this manner, the device is well suited to be used on public touchscreen devices. The device is configured to easily slide on a surface of a touchscreen.

Figure 1B:
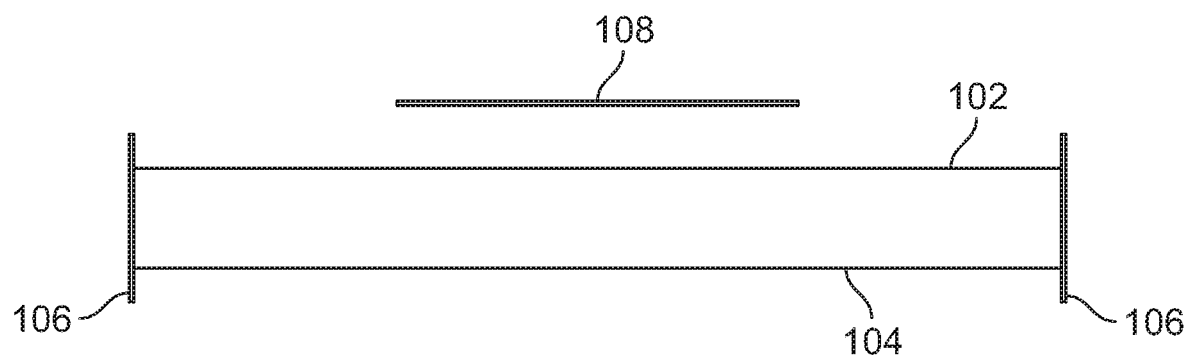
FIG. 1B illustrates a side view of a device for use with a touchscreen

FIG. 1B illustrates an embodiment where the device comprises two pieces of fabric stitched together. The top fabric 102, or the fabric intended to contact the user's hand, is soft material that has grip. The bottom layer 104 is a fabric that easily slides on the surface of the touchscreen without damaging the touchscreen. For example, the top layer may be a suede-like microfiber sewn to a bottom layer of material chosen specifically for grip on the top and sliding on the bottom. The device can be rolled and folded for convenience and when you want to rest your hand on a touch surface, you lay this down and rest your hand on it. From there, the differential of the slickness on the bottom and the grip on the top allows to the device to grip the user move easily with the user's hand.

The construction gives superior palm rejection regardless of whether the user writes on the touchscreen with a finger or a stylus. Also, resting the user's hand improves the quality of the user's interactions and writing. The ability to rest the hand on a stable surface delivers immediate improvements in precision and control, rendering an improved result. The bottom layer will help keep dirt and oils from the hand off of the surface, maintaining the pristine condition of the surface of the touchscreen. The material of the device both avoids making things worse by preventing dirt and oils from the skin to contact the screen but the movement of the fabric and improves the function of the touchscreen by absorbing and removing deposits that may already be on the screen. In other words, the device cleans the touchscreen as the user uses the device while writing or drawing on a touchscreen.

It cannot be overstated that there is a point where there is so much buildup on the screen that it begins to have an effect on the functioning of the device; this buildup may not be visible, except under special circumstances. This can result in the non-registration of the occasional touch and gesture but when using a stylus, if you hit an invisible oil deposit, it will imperceptibly "skid" on the surface as it loses the friction that is required for consistent control of the instrument. This intermittent skidding over the surface, contributes to making handwriting illegible or altering drawings. The present device effectively helps keep the touchscreen device working like new, responsive and accurate.

As illustrated in FIGS. 1A, 1B, the two layers of material that are bound together at the edge with stitching 106. Each layer having a distinct purpose of providing, grip, or less friction and the ability to clean oily surfaces from touchscreens. In one embodiment, the two layers of material are together at the edge with stitching 106 and closer to the center with stitching 110.

The top layer 102 also allows for a logo 108, text, or image to be applied directly on the material. The logo 108 may be heat applied to the surface or printed with an ink. As the two layers of fabric will have a tendency to separate The inner concentric inner circle stitch 110 is there to bind the upper and lower layers together; therefore, both seams are functional and cosmetic. It reinforces the concentric circle pattern visually, creating a thicker ring around the edge, while closing off the interior completely. The outer stitching layer is also configured to further hide the construction seams as they get covered up by the outer stitch itself, which hiding of the stitch helps the device stay together, prevents snagging, and provides a better gliding experience as described further below.

The stitch thread may be of any suitable material and any desired color. In one embodiment, the color matches the color of the elastane on the bottom so as to not see the stitching on the bottom layer. The stitching should not be bulky; however, it does need to be tight and flat as one would find on garments (similar to embroidery). In one embodiment, the outer stitching provides an additional surface that helps the device slide on the surface of the touchscreen.

The stitching material comprises a thread of any suitable material such as cotton, linen, nylon, and silk. The thread may be spun to provide a thicker thread.

Figure 2:
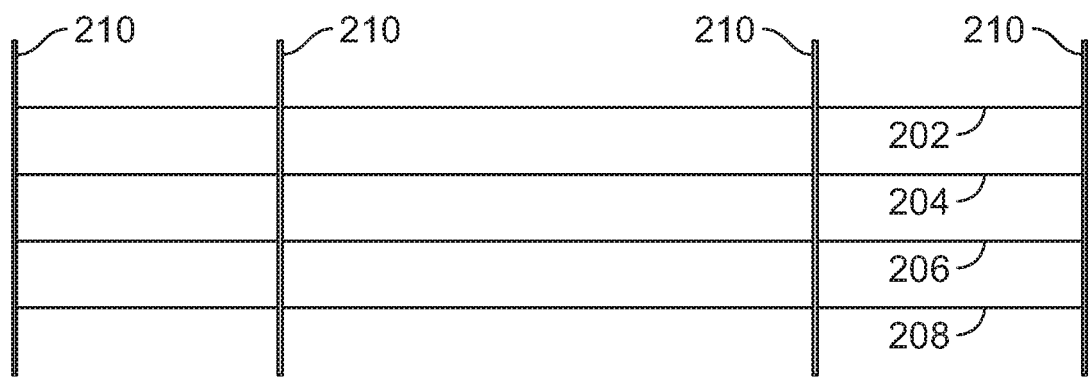
FIG. 2 illustrates layers of an alternative embodiment of a device for use with a touchscreen.

In another embodiment shown in FIG. 2, one or more additional layers 204, 206 of material are provided between the top layer 202 and the bottom layer 208. The layers are held together by stitching 210 near the edge. In one embodiment, a second set of stitching is applied in a central portion of the device. In another embodiment, additional stitching or seams are utilized to attach the additional layers to each other or to the top layer 202 or the bottom layer 208. The additional stitching or seams are not visual on the exterior, are not felt by the user, and do not contact the touchscreen.

The additional layers 204, 206 has four primary functions: to provide a cushioning thickness, create additional distance from the hand to the touch surface, which serves to enhance palm rejection, to manifest an insulating or isolating barrier against a warm or cold surface, and to fill out and help retain the shape of the device. Another advantage provided by additional layers is that the layers make the device compressible. Compressing the device contributes to the tendency to move horizontally with the hand since the user is pushing from inside of a subtle depression that user's hand makes in the layers as the device compresses.

The additional layers 204, 205, may be batting such as a synthetic felt. The additional layer may include a single layer, two layers (as shown) or more as needed to provide a combination of a suitable thickness of the device as well as comfort to the user.

Figure 3:
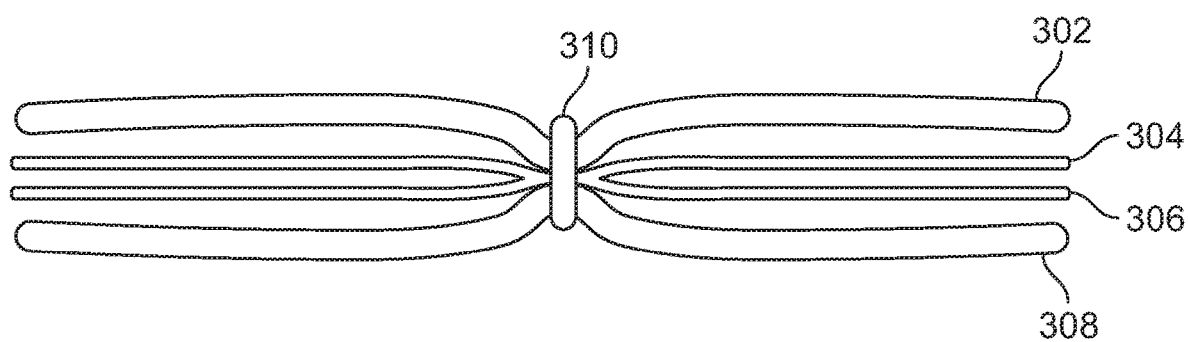
FIG. 3 illustrates a side view of seam of a device for use with a touchscreen.

FIG. 3 illustrates an important aspect of choosing the right materials and thickness for the batting is what is referred to as "pillowing." Pillowing refers to the behavior and performance of a material that has four layers of soft, stretchy material sewn such that the material will be pulled together somewhat tightly, collapsing the natural airspaces and overcoming the natural sponginess of the weave. The top layer 302, the inner layers 304, 306, and the bottom layer 308 are bonded by a seam 310. The same way a carpenter will "countersink" a brad below the surface of a wood table, so that the hand does not feel the nail, this construction should have a similar effect of causing the seam to recede into the material achieving a pillowing effect; this helps prevent the hand from feeling the seam as being prominent.

Note that this approach does not require that the seam completely disappear in order for the effect to be successful so having a seam with a little "give" to it would be preferable to a seam that is hard and stiff. Since this device is something you rest your hand on, the goal is to enhance feeling the material while reducing any feeling of the inner seam. That is one reason to consider having the logo printed in the center instead of embroidered.

The materials for the top layer, the bottom layer, and the inner layers (if provided) may be any suitable material so long as the device has certain desirable characteristics. Desirable characteristics include: foldable, collect dirt from the touchscreen, washable, lightweight, durable, grip the user, slip on the touchscreen, comfort, padding, and thickness. Also, it is desirable to select materials that have a high shearing/sliding friction component against the skin so that when the user's hand moves the device readily moves with the hand.

It is desirable that device be foldable so that a user may easily carry the device in a bag or pocket, yet retain its shape when unfolded without wear such as tearing or a crease. It is also desirable that the device is lightweight to make it easier to carry. Another advantage to a lightweight device is reduces the resistance to movement when the user's hand moves.

It is desirable that the device is collect dirt and containments from the screen. The bottom layer may be a woven material having airspaces that collect containments, such as dirt or oil, as it moves along the surface of the screen. This enables the device to clean the touchscreen while the user is using the device making the screen cleaner after use than before use.

It is desirable to have the device be washable and durable so that after the device is soiled, on either the top or bottom layer, that device can be washed by hand or in a washing machine and maintain its original characteristics.

It is desirable that the top layer has a comfortable feel to the user and the user's skin.

Padding and thickness are selected in order to achieve the characteristics above and to create a device that has enough stiffness to maintain its shape when the device is partially on the touchscreen and partially off the touchscreen. The device is configured to enable the user to feel the edge of the touchscreen but to not bind or catch on the edge.

In order to achieve the above characteristics, the top layer, inner layer, and bottom layer may comprise any suitable material such as vinyl, leather, suede, cotton, rubber, lycra, felt, chamois, velvet, linen, flannel, neoprene, silicone elastane blends, or microfiber suede. In one embodiment, the bottom layer comprises an elastane blend. In one embodiment, the top layer comprises a microfiber suede.

Figure 4A:
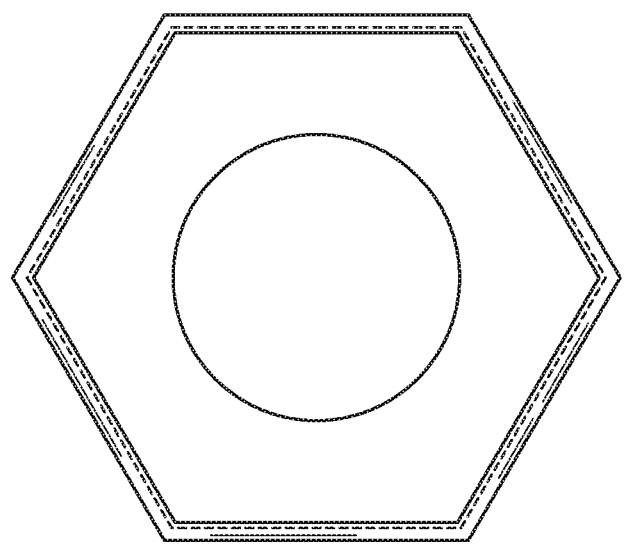
FIGS. 4A-B illustrate exemplary alternative shapes of a device for use with a touchscreen.
Figure 4B:
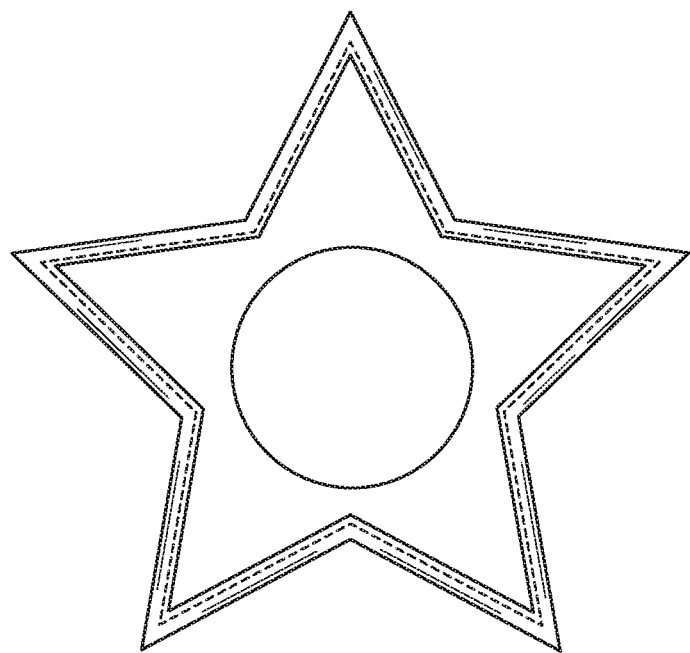

FIGS. 4A-B illustrate embodiments where the shape of the device is a hexagon (FIG. 4A) or a star (FIG. 4B). The shape can be any other desirable shape such as an oval, a pentagon, an octagon, or trapezoid, a rectangle, a square, a crescent moon shape and so forth.

Figure 5:
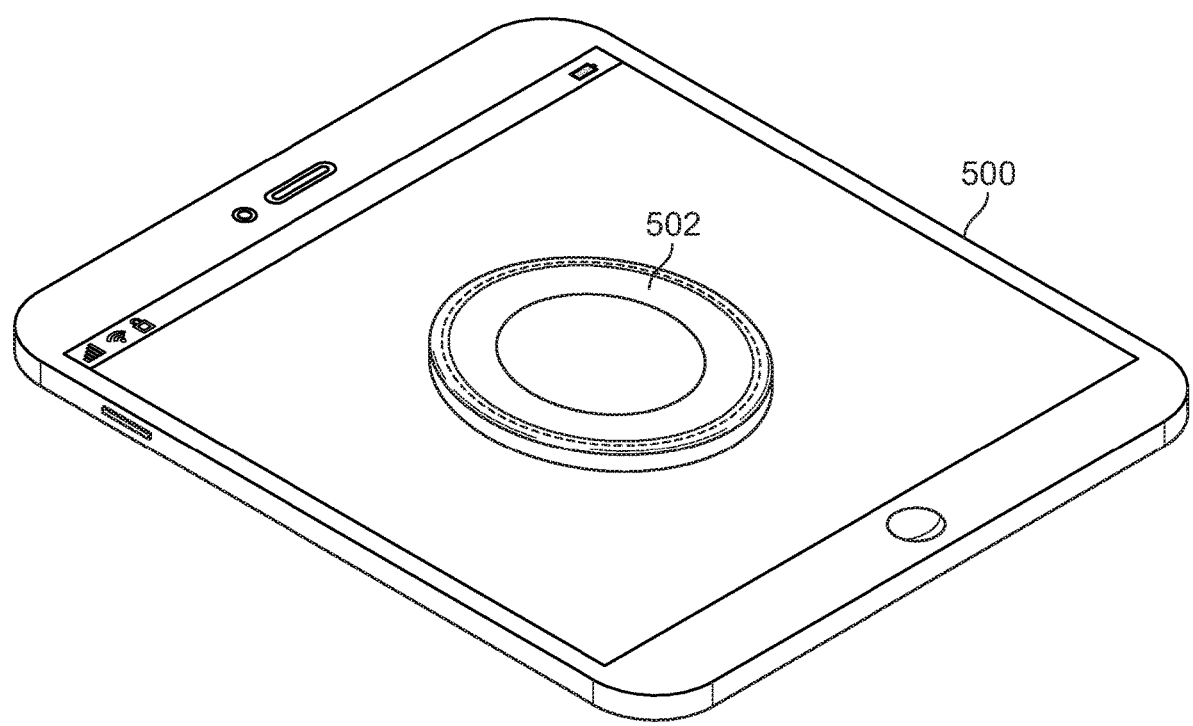
FIG. 5 illustrates a device placed on a surface of a touchscreen.

FIG. 5 illustrates the device placed on the surface of a touchscreen. A method of using the device when placed on a touchscreen will be described with reference to FIG. 6 and FIG. 7.

Figure 6:
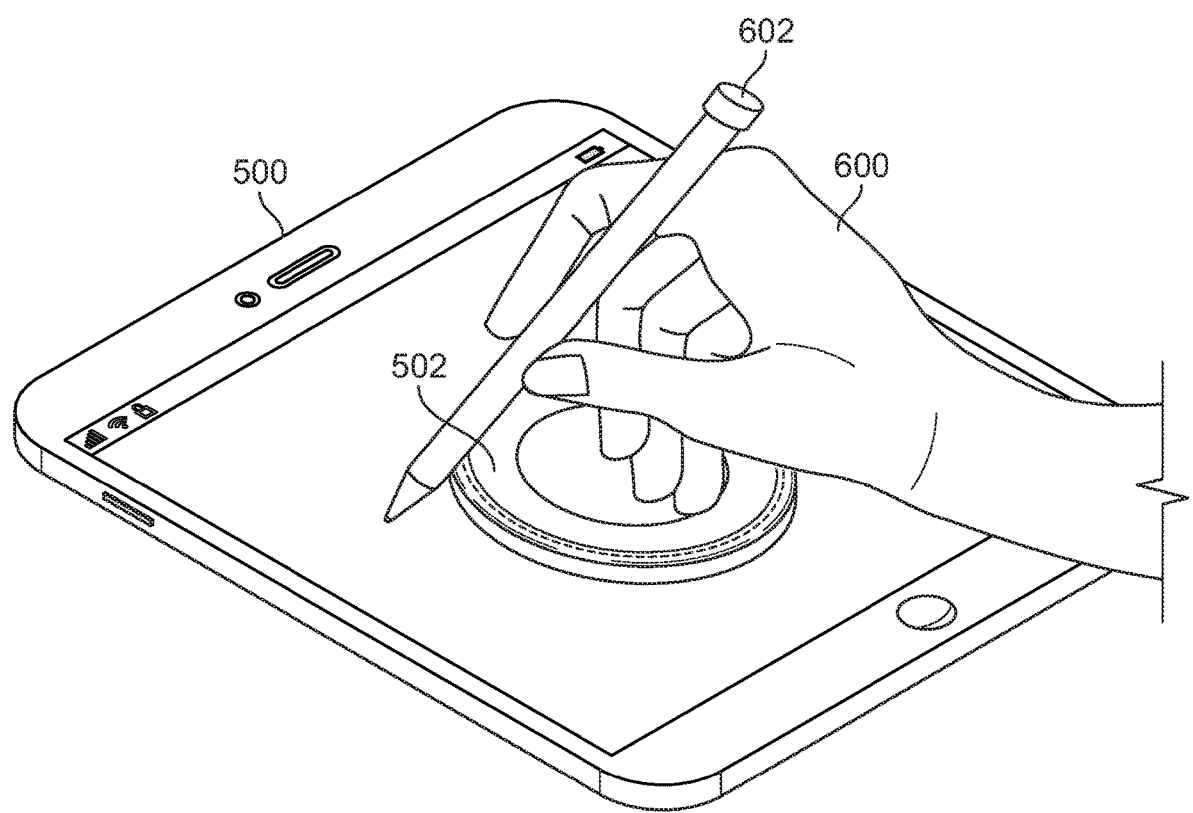
FIG. 6 illustrates a user's hand on the device on a touchscreen.
Figure 7:
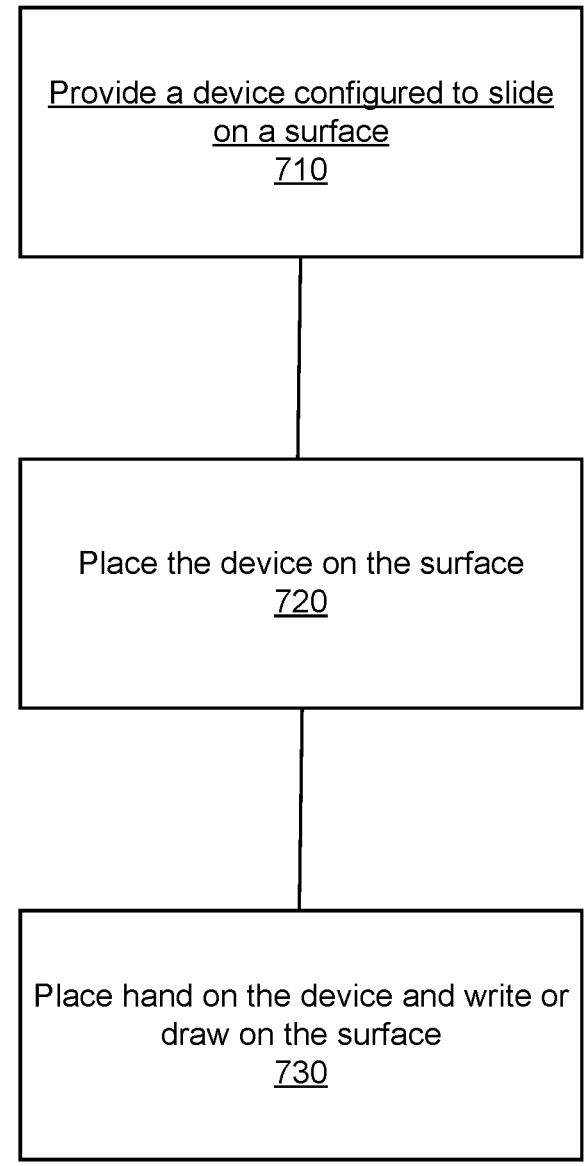
FIG. 7 is flowchart illustrating a method of using the device.

FIG. 6 illustrates a hand resting on the device while writing or drawing on the surface of a touchscreen. The method of writing or drawing includes providing a device configured to slide along a surface of the touchscreen (710). The device is placed on the surface of the touchscreen (720). A hand is rested or placed on a top surface of the device (730). The user writes or draws on the touchscreen using a finger, a stylus, an electronic pen, or another suitable device. When the hand moves the device moves with the hand and slides along the surface of the touchscreen.

As described above, the device comprises a first layer, a second layer, and an attachment device configured to combine the first and second layers about an outer periphery and at a second internal portion. The first layer is configured to grip on the hand. The second layer is configured to clean the surface of the touchscreen when the device moves along the surface of the touchscreen.

When the hand moves the device moves with the hand and slides along the surface of the touchscreen and the device cleans the surface of the touchscreen as moves along the surface of the touchscreen.

Figure 8:
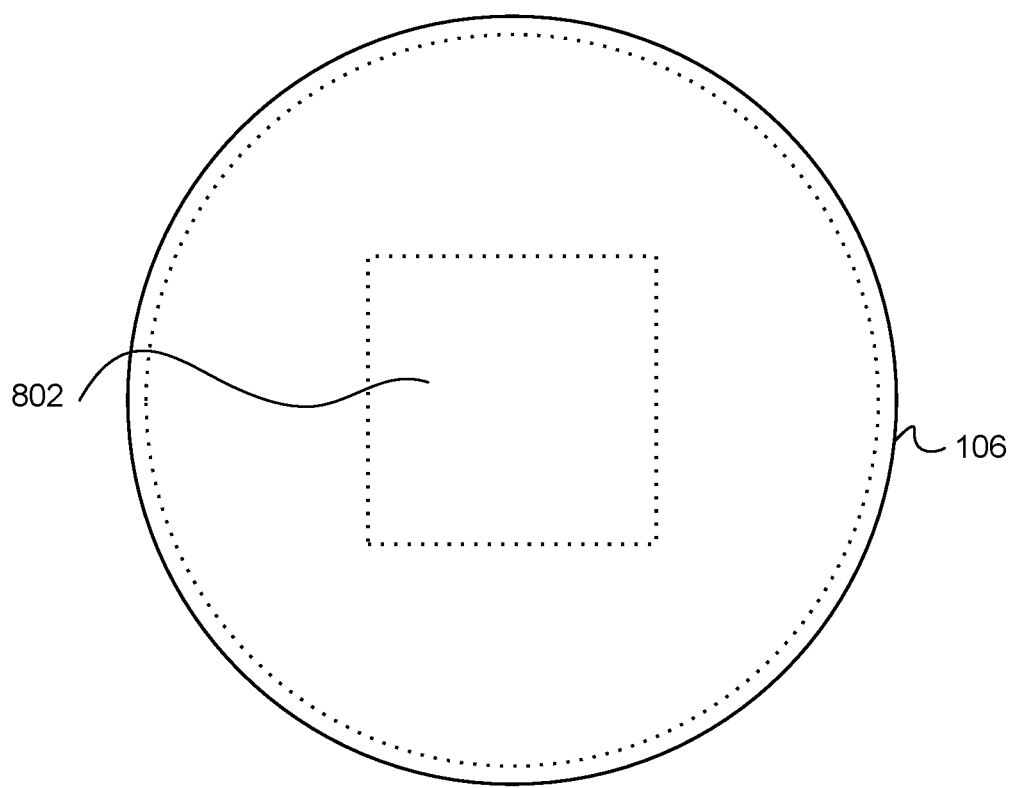
FIG. 8 illustrates an embodiment including electronics.

The above embodiments have primarily focused on the device being used in a passive manner. In yet another embodiment, shown in FIG. 8, an intuitive or non-passive version of the device includes embedded wires and circuitry 802, and potentially sensors. For example, in one embodiment, a concentric wire is formed in the device between the top and bottom layers, with an opening on a portion thereof. The touchscreen has the ability to sense the wire, and in certain positions can indicate using the device in a passive manner—e.g. a resting spot for the side or palm of the user's hand on the screen as they write or draw. When the device is moved in a direction or rotated, the signal sensed by the computing device associated with the touchscreen can determine the movement or rotation is meant to alter the state from a passive to active phase. For example, the rotation could turn the device into an "eraser." Any movement or change in state or orientation could be coupled with selecting the right hue, contrast or other fine-tuning feature often associated with user's editing, drawing or otherwise creating artistic projects.

In yet other embodiments, sensors detecting the change in pressure can work with software to also modifying the processing of the features associated with the particular program. In one such embodiment, an RFID chip is used that can communicate with the NFC chip of a tablet, laptop, smartphone and similar computing devices. The pressure changes from the center area versus the outer ring of the device can also be controls to manipulate programs and features therein.

In other embodiments, two or more devices are provided, each having a different identity. The devices can be used to modify or control a processing device associated with a touchscreen. The identity of the device placed on the touchscreen is detected and used to control a specific aspect, mode or software of the processing device. For example, a set of devices is provided having a first device for use with writing and a second device for use with drawing. When a user places the first device down, the processor will run software configured to identify hand written words and letters. When the user places the second device down the processor will open a drawing program. Any number of devices may be provided in the set.

In another embodiment, each device indicates a specific user. The programming device has a default condition programmed for each user, and the device automatically selects the default condition for the user associated with the specific device that is placed on the screen.

In the previous embodiment, the device has been described for use with a touch screen or a touch enabled device. However, the device may be utilized on other hard smooth surfaces that a user will write or draw on. For example, the device may be placed on the surface of a table that is a chalkboard, white board, glass, or other surface that is directly written on. The device will still have the benefits of stabilizing the user's hand and protecting the surface.

Various embodiments and options have been described herein that are exemplary of the present invention; one skilled in the art will recognize additional embodiments within the spirit and scope of the invention. Modification and variations can be made to the disclosed embodiments without departing from the scope of the disclosure. Those skilled in the art will appreciate that the applications of the embodiments disclosed herein are varied. Accordingly, additions and modifications can be made without departing from the principles of the disclosure. In this regard, it is intended that such changes would still fall within the scope of the disclosure. Therefore, this disclosure is not limited to the particular embodiment as shown, but is intended to cover modifications within the spirit and scope of the disclosure.

What is claimed is:

1. A device for use with a touch-enabled surface of a computing device, the device comprising:
    a first layer comprised of micro fiber suede material, having a first set of characteristics that includes providing grip to a portion of a user's hand;
    a second layer comprised of a woven elastane material having a second set of characteristics wherein at least one or more characteristics differ from that of the first layer including enabling the second layer to slide consistently along the touch-enabled surface of the computing device;
    a third layer and fourth layer disposed between the first and second layers, wherein the third and fourth layers are formed of a synthetic felt material and configured to enhance palm rejection; and
    stitching configured to combine the first, second, third and fourth layers about the entirety of an outer periphery.

2. The device of claim 1, wherein the first layer characteristics further includes foldable, washable, lightweight, and durable.

3. The device of claim 1, wherein the second layer characteristics further includes foldable, collect dirt and oils from the touch-enabled surface, washable, lightweight, and durable.

4. The device of claim 1, wherein the second layer collects contaminants when the device moves along a surface of the touch-enabled surface.

5. The device of claim 1 wherein the third layer provides thickness and padding to the device.

6. The device of claim 5, wherein the thickness and padding provide additional grip of the device to a user and improve movement of the device along the touchscreen with movement of the user.

7. The device of claim 1, wherein the stitching is configured to help the device slide on the touchscreen.

8. The device of claim 1, wherein the stitching comprises a thread.

9. The device of claim 1 wherein the third layer and the fourth layer provide thickness and padding to the device.

10. The device of claim 1, wherein the device is configured to be folded and retain its original characteristics when the device is unfolded.

11. A method of writing or drawing on a touchscreen of a computing device, the method comprising:
    providing a device having a bottom layer formed of a woven elastane that is configured to slide along a surface of the touchscreen;
    placing the device on the surface of the touchscreen;
    resting a hand on a top layer of the device, wherein the top layer is formed of a micro fiber suede material suited to grip the hand; and
    writing or drawing on the touchscreen using a stylus, finger, or electronic pen, wherein when the hand moves the device moves with the hand and slides along the surface of the touchscreen, and wherein such movement allows the device to clean the surface of the touchscreen by trapping oils and contaminants in the woven elastane layer.

12. A method of writing or drawing on a touchscreen of a computing device and cleaning a surface of the touchscreen, the method comprising:
    providing a device having a first layer having a first set of characteristics;
    a second layer formed of a woven elastane material having a second set of characteristics wherein at least one or more characteristics differ from that of the first layer;
    an attachment device configured to combine the first and second layers about an outer periphery, wherein the second layer is configured to slide along a surface of the touchscreen;
    placing the device on the surface of the touchscreen;
    resting a hand on the first layer of the device;
    writing or drawing on the touchscreen using a stylus, finger, or electronic pen;
    and moving the hand, wherein when the hand moves the device moves with the hand and slides along the surface of the touchscreen and the device cleans the surface of the touchscreen as the device moves along the surface of the touchscreen.

* * * * *